April 2, 1935.  B. R. BENJAMIN ET AL  1,996,229
METHOD OF CASTING WHEELS
Filed Aug. 11, 1933
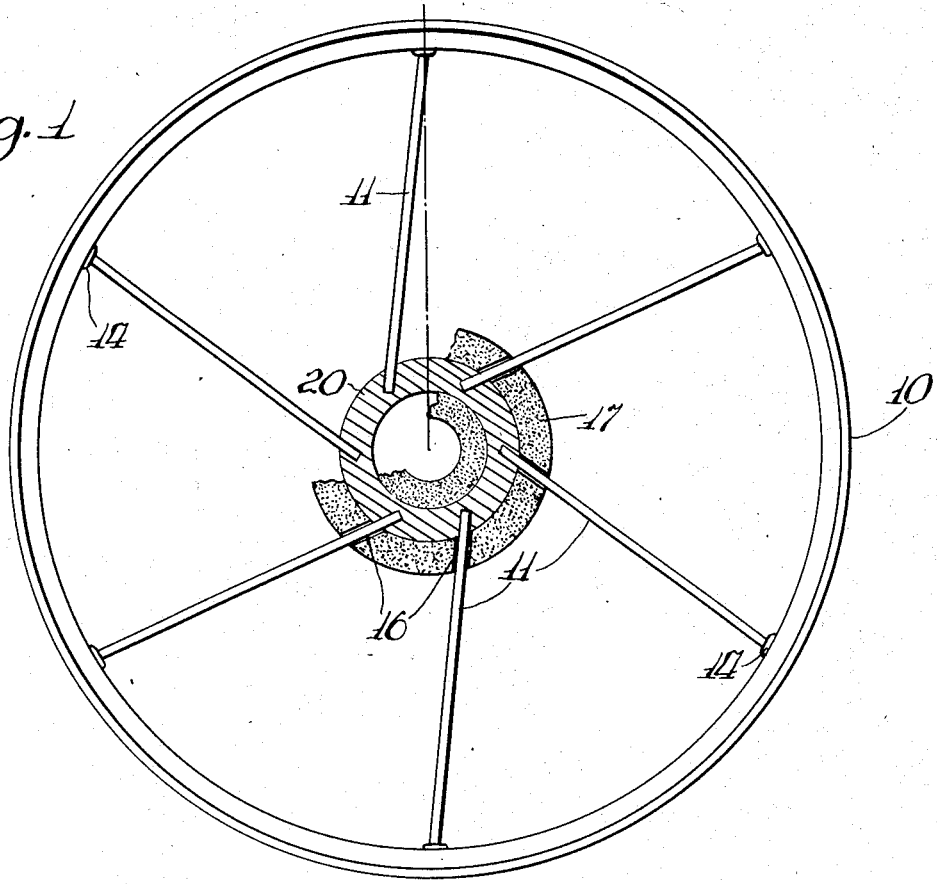
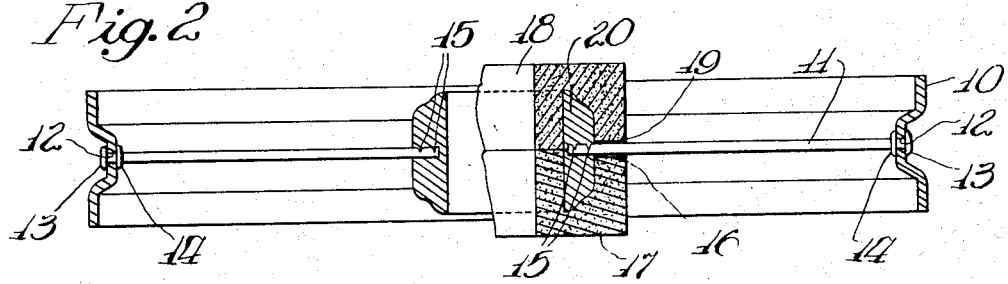
Inventors
Bert R. Benjamin
Oliver A. Zimmerman
By H. P. Doolittle
Atty.

Patented Apr. 2, 1935

1,996,229

UNITED STATES PATENT OFFICE 1,996,229

METHOD OF CASTING WHEELS

Bert R. Benjamin, Oak Park, and Oliver B. Zimmerman, La Grange, Ill., assignors to International Harvester Company, a corporation of New Jersey Application August 11, 1933, Serial No. 684,646

4 Claims. (Cl. 22—203)

This invention relates to a method of manufacturing wheels. More specifically, it relates to improvements in manufacturing wheels having a cast metal hub, which is molded upon the spokes after they are secured to the rim.

The principal object of the invention is to provide a method of constructing wheels by casting the hub, in which the tension on the spokes of the finished wheel may be controlled. More particularly, the object is to provide for lengthening the spoke between the hub and rim greater than the final length when the hub is cooled, whereby the resultant tension is reduced.

The above objects are accomplished by positioning the spokes, after they are secured to a continuous rim, at an angle away from the true radius, all the spokes being positioned at the same angle in the same angular direction. The hub ends are then placed in the mold and the hub casting is formed. During the cooling of the casting, the spokes may bend back to true radial positions, thereby reducing the resultant tension.

In the drawing:

Figure 1 is a plan view of a wheel illustrating the method of the invention, with the hub broken away in section on the dividing line of the hub mold;

Figure 2 is a section through the wheel shown in Figure 1, taken through the center; and, Figure 3 shows a portion of a wheel rim and hub with one spoke therebetween illustrating a modified hub end for the spoke.

In constructing a wheel in accordance with the method of this invention, a continuous rim 10 is first formed. The rim may be of any shape in cross section, a particular V-groove type being illustrated, which has very good resistance to distortion or bending of the rim out of circular shape. A plurality of spokes 11 are secured to the rim 10 by any well known method, by which the spokes may be secured against radial movement with respect to the rim. As illustrated, the spokes are extended through openings 12 in the rim, heads 13 being formed in the V-channel of the rim, and shoulders 14 being formed on the spokes inside the channel. The hub ends of the spokes are provided with notches 15, or other suitable means, to obtain a suitable bond with the metal of the cast hub.

As indicated by the dotted line in Figure 1, in comparison to the position of the spoke 11 adjacent the line, said spoke is bent away from a true radius by a certain angular distance. Each of the spokes is bent away from a true radius from their point of attachment on the rim in the same angular direction and for the same angular distance.

After the spokes are secured to the rim, they are inserted in free semi-circular notches 16 formed in the lower half 17 of a sand mold. The upper half 18 of the mold is then placed in position with the semi-cylindrical notches 19 fitting over the spokes. The dividing line of the mold is in the plane of the spokes, as shown in Figure 2. The notches 16 and 19 are formed to closely embrace the spokes to prevent the escape of molten metal during the operation.

After the molds are in position, metal is poured, forming the hub 20. As molten metal cools, it contracts by a predeterminable amount. In common practice in the manufacture of wheels having cast hubs, the hub in shrinking by cooling passes an excess tension upon the spokes, which may either destroy the circular shape of the wheel or result in a short life for the wheel. As above pointed out, the principal object of the present invention is to solve the difficulty heretofore encountered and provide a method in which the tension of the spokes of a cast hub wheel may be controlled.

With the spokes 11 bent away from true radii, the distance between the rim and the outer edge of the hub is greater than the radial distance between the hub and the rim. This difference in length can be easily calculated, as it depends upon the sine of the angle included between the spoke and the corresponding radius. As the hub cools and contracts, tension is exerted upon the spokes. As there is nothing to hold said spokes from assuming their radial positions except the bending stress of the spoke material, the hub rotates the slight angular distance with respect to the rim necessary to relieve the tension in the spokes. If there is sufficient shrinkage in the hub casting to produce sufficient tension, the spokes, due to the cooling process, will be drawn back into substantially radial positions. It will be understood that by this method a given amount of shrinkage, which may be calculated, can be taken care of by determining the necessary angle of the spokes with respect to true radii. By this method, a wheel may be constructed with a predetermined amount of tension in the spokes.

Figure 3 shows a modification in which the spokes 11 are preformed with a hub end 21 which may lie on a true radius within the hub casting. The bending outside the hub, brought about by shrinkage, brings the main portion of the spoke and the portion within the hub into substantial alignment.

Although applicant has shown and described only certain preferred forms which may embody his improved method of constructing wheels, he claims as his invention all methods falling within the scope of the appended claims.

What is claimed is:

1. A method of making metal wheels which comprises securing a plurality of spokes to a continuous rim, bending the spokes angularly relative to radii of the rim so that their inner ends lie away from the radii extending from the points where the spokes are secured to the rim, and casting a hub on the inner ends of said spokes, tension of the spokes being reduced to a desired value by angular movement of the hub about the wheel axis relative to the rim during cooling and contraction of the hub.

2. A method of making metal wheels which comprises securing a plurality of spokes to a continuous rim, bending the spokes angularly relative to radii of the rim so that their inner ends lie away from the radii extending from the points where the spokes are secured to the rim, and inserting the hub ends of the spokes in a mold and forming a hub by filling the mold with molten metal, tension of the spokes being reduced to a desired value by angular movement of the hub about the wheel axis relative to the rim during cooling and contraction of the hub.

3. A method of making metal wheels which comprises securing a plurality of spokes to a continuous rim, deflecting the spokes so that their hub ends lie away in the same angular direction from the radii extending from the points where the spokes are secured to the rim, and casting a hub on the hub ends of the spokes, excess tension of the spokes brought about by cooling and contraction of the hub being relieved by angular movement of the hub about the wheel axis relative to the rim.

4. A method of making metal wheels which comprises securing a plurality of spokes to a continuous rim, deflecting the spokes so that their hub ends lie away in the same angular direction from the radii extending from the points where the spokes are secured to the rim, inserting the hub ends of the spokes in a mold, and forming a hub by filling the mold with molten metal, excess tension of the spokes brought about by cooling and contraction of the hub being relieved by angular movement of the hub about the wheel axis relative to the rim.

BERT R. BENJAMIN.
OLIVER B. ZIMMERMAN.